United States Patent [19]

Miller

[11] Patent Number: 4,523,608
[45] Date of Patent: Jun. 18, 1985

[54] ROTARY BALL VALVE ASSEMBLY

[75] Inventor: Ivan O. Miller, Fullerton, Calif.

[73] Assignee: Shafco Industries Inc., Buena Park, Calif.

[21] Appl. No.: 368,753

[22] Filed: Apr. 15, 1982

[51] Int. Cl.³ .............................................. F16K 5/20
[52] U.S. Cl. .................................... 137/315; 251/315
[58] Field of Search ............... 251/315, 316, 317, 362; 137/315

[56] References Cited

U.S. PATENT DOCUMENTS

| | | | |
|---|---|---|---|
| 3,073,566 | 1/1963 | Bredtschneider | 251/362 |
| 3,647,179 | 3/1972 | Scaramucci et al. | 251/315 |
| 3,722,859 | 3/1973 | Murphy et al. | 251/315 |
| 3,774,277 | 11/1973 | Bentley-Leek | 251/317 |
| 4,342,330 | 10/1982 | Wieveg et al. | 251/315 |
| 4,467,823 | 8/1984 | Shaffer et al. | 251/315 |

Primary Examiner—Martin P. Schwadron
Assistant Examiner—James R. Shay
Attorney, Agent, or Firm—William C. Babcock

[57] ABSTRACT

A rotary ball valve assembly including an elongate valve body, a first passage having a transverse pin and an elongate key of a rotatable actuator extending therein, a lower valve seat, and a ball member resting on the lower valve seat. A pair of slots are formed on the exterior of the ball member normal to the longitudinal axis of the passage extending therethrough, which slidably engage the pin and key when the ball member rests on the lower valve seat. By rotating the ball member one quarter turn by the key of the actuator the ball member is moved downwardly to compress the elastomeric ring which partially defines the lower seat. An upper ring shaped valve seat is disposed on the first passage above the ball member. The upper surface of the valve seat is in abutting contact with a segmented ring that has an upwardly and inwardly tapered external side surface and an internal side surface that tapers upwardly and outwardly. The inner side surface of the segmented ring is in contact with a downwardly and inwardly tapered side surface of a rigid locking ring that is removably held in a fixed position in the valve body by a snap ring. When the ball member is in a closed position and subjected to an upward force due to high pressure gas or fluid from therebelow, a substantial portion of this upward force is transmitted laterally to the valve body.

2 Claims, 5 Drawing Figures

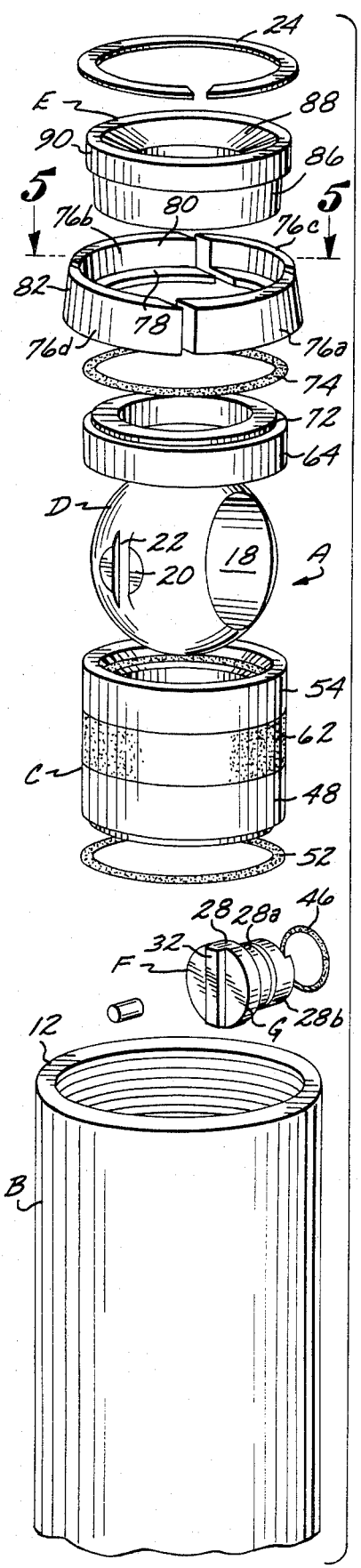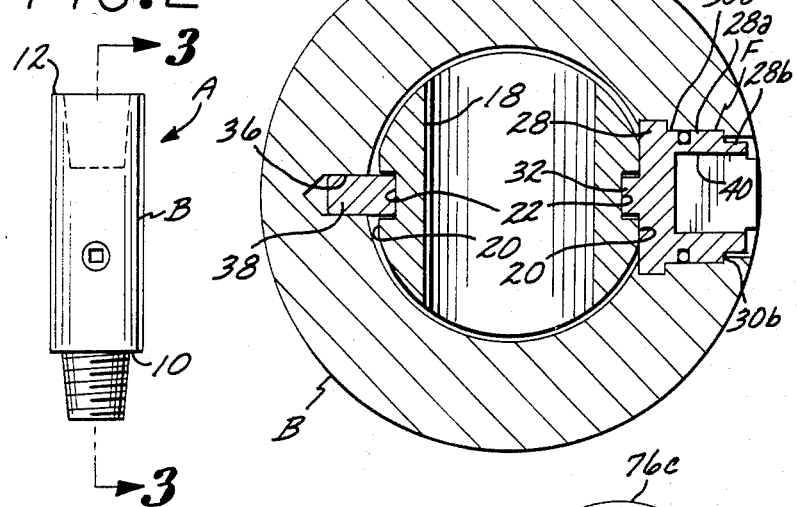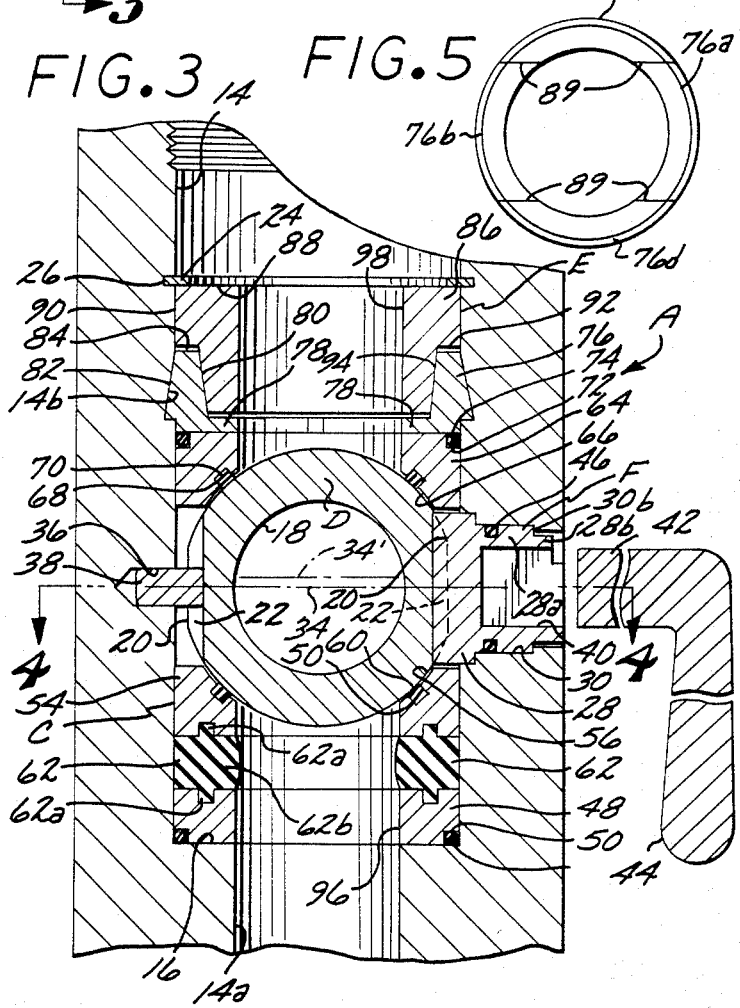

ROTARY BALL VALVE ASSEMBLY

DESCRIPTION OF THE PRIOR ART

Numerous rotary ball valve assemblies have been devised and used in the past. All of such devices have the operational disadvantage that periodically the portions thereof in sealing contact with the ball member must be adjusted by the use of suitable hand tools to prevent leakage of fluid past the ball member.

A further operational disadvantage of such prior art valves is that the valve body must be sufficiently massive as to withstand the longitudinally directed force exerted thereon by high pressure fluid below the ball member when the latter is in a closed position.

The primary object of the present invention is to provide a rotary ball valve in which the actuator not only serves to pivot the ball member between an open and closed position, but initially to cam the ball member and a resilient lower seat downwardly to permit an upper seat to be removably placed in abutting contact with the ball member, and the actuator when rotated an additional quarter turn allowing the resilient lower seat to expand upwardly with likewise movement of the valve member whereby the upper and lower valve seats exert an equal sealing force on the ball member, and will continue to do so until the valve assembly is dismantled.

Another object of the invention is to provide a valve that includes an upper valve seal assembly of such structure that when the ball member is in a closed position the upward force exerted on the ball member by high pressure fluid therebelow is distributed both longitudinally and transversely on the valve body and a locking ring that forms a part of the upper valve seat assembly, and as a result the valve body capable of being more compact and of lighter weight than that required if it was to withstand the upward force when applied longitudinally to the valve body.

SUMMARY OF THE INVENTION

A rotary ball valve assembly that includes an elongate valve member that has first and second ends between which a first passage extends, and the first passage adjacent the first end having a body shoulder therein on which a first valve seat rests that includes a ring shaped elastomeric body. The valve body between the body shoulder and second end rotatably and sealingly supports a rotatable actuator that includes an elongate key that projects into the first passage. The center of rotation of the actuator is on a first transverse centerline that extends longitudinally through a pin supported by the valve body, which pin extends into the first passage.

A ball member that has a second passage extending diametrically therethrough is rotatably supported in the first passage and is initially placed in the first passage to rest on the first valve seat when a pair of oppositely disposed slots on the exterior of the ball member are caused to engage the pin and key. When the actuator is rotated a quarter turn the key not only rotates the ball member, but cams the ball member towards the first valve seat to compress the elastomeric member, and the first and second centerlines being substantially coaxially aligned.

A second valve seat assembly is now disposed in the first passage in abutting sealing contact with the ball member, and removably locked in this position. When the actuator is rotated a second quarter turn, the pair of slots are parallel to the first passage. The compressed elastomeric member tends to expand longitudinally and exerts a longitudinal force on the ball member that is opposed by an equal force exerted on the ball member by the second valve seat. Thereafter, as the ball member is rotated between an open and closed position the first and second valve seats sealingly engage the ball member with an equal force.

The second valve seat assembly includes a segmented ring that has external and internal tapered side surfaces that engage a tapered recess in the valve body and a tapered portion of a locking ring, with the tapered elements so cooperating that when the ball member is in a closed position, the upward force exerted thereon by high pressure fluid therebelow is transferred both longitudinally and transversely to the valve body and locking ring to permit the valve body to be more compact and of lighter structure than that required if the valve body was to withstand the force when directed longitudinally thereon.

BRIEF DESCRIPTION OF THE DRAWING

FIG. 1 is a exploded perspective view of the rotary ball valve assembly;

FIG. 2 is a side elevational view of the assembly;

FIG. 3 is an enlarged vertical cross sectional view of the rotary ball valve assembly taken on the line 3—3 of FIG. 2;

FIG. 4 is a transverse cross sectional view of the rotary ball valve assembly taken on the line 4—4 of FIG. 3; and FIG. 5 is a top plan view of a segmented ring taken on the line 5—5 of FIG. 1.

DESCRIPTION OF THE PREFERRED EMBODIMENT

The rotary ball valve assembly A is shown in exploded perspective form in FIG. 1 and in cross section in FIG. 3. The rotary ball valve assembly A includes an elongate valve body B of cylindrical configuration that has a first end 10 and a second end 12. A longitudinal first passage 14 extends from the second end 12 towards the first end 10, with the first passage developing into a ring shaped body shoulder 16 from which an extension 14a of the passage continues through the second end 10. Both the first end 10 and second end 12 are threaded to permit the valve body B to be placed in communication with a drill string (not shown).

In FIG. 3 it will be seen that the body shoulder 16 supports a first valve seat assembly C on which a ball member D rests, which ball member has a second passage 18 extending diametrically therethrough that is illustrated as being slightly larger in diameter than the diameter of the passage extension 14a.

The ball member D as may be seen in FIG. 1 has a pair of oppositely disposed flat surfaces 20 defined thereon that have a pair of oppositely disposed elongate slots 22 extending inwardly therefrom, with the pair of slots positioned normal to the longitudinal axis of the passage 18.

The passage 14 as may best be seen in FIG. 3 has a second valve seat assembly E disposed therein in abutting contact with the ball member G, with the second valve seat assembly being removably held in the valve body B by a snap ring 24 that removably engages a circumferentially and transversely disposed groove 26 formed in the valve member B and extending outwardly from the passage 14 as shown in FIG. 3.

An actuator F for rotating the ball member D from an open to a closed position is shown in FIGS. 1 and 3, with the actuator including longitudinally aligned first, second and third portions 28, 28a and 28b that are of decreasing diameter. The actuator as shown in FIG. 3 is rotatably and sealingly supported in a transverse opening 30 formed in the valve member B, with the opening having first and second shoulders 30a and 30b defined therein, against which the first and second actuator portions 28 and 28a abut.

In FIGS. 1 and 3 it will be seen that an elongate key 32 projects from the face of the first actuating portion 28 and is disposed within the passage 14. The axis of rotation of the actuator F is a first transverse centerline 34 that extends through the center of a recess 36 formed in the valve member B and extending outwardly from the passage 14. The recess 46 removably supports a pin 38 through which the centerline 34 extends longitudinally, with the pin projecting inwardly into the passage 14.

The actuator F has a non-circular recess 40 extending inwardly from the outer end thereof, which recess may be removably engaged by a head 42 of non-circular transverse cross section that is secured to an actuator handle 44 as shown in FIG. 3. The actuator F on the portion 28a thereof has a circumferentially extending groove therein in which a resilient ring 46 is mounted that rotatably and sealingly engages the opening 30 between the body shoulders 30a and 30b.

The first valve seat assembly C as may be seen in FIGS. 1 and 3 includes a first rigid ring 48 that slidably and snuggly engages the passage 14 and rests on the body shoulder 16. The ring 48 has a recess 50 in the lower portion thereof as shown in FIG. 3 in which a resilient sealing ring 52 is disposed, that is in pressure sealing contact with both the seat 16 and the interior surface of the valve member B that defines the passage 14.

The first valve seat assembly C also includes a second rigid ring 54 that has an upwardly disposed concave surface 56 as viewed in FIG. 3 that substantially conforms to the exterior surface of the ball member D, with the surface 56 having a circular recess 58 extending downwardly therein, and the recess 58 removably supporting a resilient sealing ring 60 that has an internal diameter greater than the diameter of the passage 18. The first and second rigid rings 48 and 54 are separated by a heavy elastomeric ring 62 formed from rubber, a suitable polymerized resin or the like, which ring has oppositely disposed projecting portions 62a that engage recesses formed in the adjacent surfaces of the first and second rings 48 and 54, and the ring 62 being bonded on the first and second rings by conventional means (not shown).

The second valve seat assembly E as best seen in FIG. 3 includes a first rigid ring 64 that may be slid downwardly in the passage 14, with the ring 64 including a concave ring shaped surface 66 that conforms substantially to the curved exterior surface of the ball member 18, and the surface 66 having a circular groove 68 extending inwardly therefrom, which groove has an interior diameter greater than the diameter of the passage 18. The groove 68 supports a resilient sealing ring 70 that as may be seen in FIG. 3 is in abutting sealing contact with the exterior surface of the ball member D.

In FIG. 3 it will be seen that the passage 14 is partially defined by a cylindrical outwardly tapered wall recess 14b that terminates on the lower end in a body shoulder 14c from which the passage 14 continues downwardly. The upper outer portion of the first ring 64 as shown in FIG. 3 has a groove 72 extending circumferentially therearound, and this groove supporting a resilient sealing ring 74. The ring 74 is adjacent the body shoulder 14c. A rigid segmented ring 76 is disposed in the passage 14 as shown in FIG. 3, with the ring being defined by a number of arcuate segments 76a, 76b, 76c and 76d. Each of the segments includes an inwardly extending arcuate flange 78, and each segment also including an upwardly extending arcuate wall that tapers outwardly. Each segment also including an exterior surface 82 that extends downwardly and outwardly and is in slidable contact with the tapered surface 14b of the valve body B. An end surface 84 extends between the upper extremities of the inner surface 80 and outer surface 82. The sealing ring 74 is in abutting sealing contact with the lower surfaces of the flanges 78.

The segments 76a, 76b, 76c and 76d have adjacently disposed surfaces 89 that are slidable relative to one another and are so arranged that the segment may be consecutively positioned within the passage 14 to rest on the body shoulder 14c or resilient ring 74 and when completely assembled define the segmented ring 76 as shown in FIG. 5. The second valve seat assembly E includes an upwardly disposed locking ring 86 as shown in FIG. 3 that has an upper end surface 88 of ring shaped configuration from which an outer wall surface 90 extends downwardly and slidably engages the passage 14. The outer surface 90 develops into an inwardly extending ring shaped body shoulder 92 from which a tapered outer surface 94 extends downwardly to slidably engage the inner surface 80 of the segmented ring 76. The locking ring 86 of the second valve assembly E has a passage 98 extending longitudinally therethrough that is slightly larger than the passage 18, and of substantially the same diameter as the longitudinal passage 96 defined in the first valve seat assembly E.

The rotary ball valve is initially assembled from the components shown in FIG. 1 by sliding the first seat assembly C downwardly in the passage 14 to rest on body shoulder 16 as shown in FIG. 3. The actuator F is now inserted in the opening 30 as is the pin 38 in recess 36 as shown in FIG. 3. Ball member D is now moved downwardly in passage 14, with the pair of slots 22 longitudinally disposed so that they may slidably engage the pin 38 and key 32. The height of the first valve seat C is such that the transverse centerline 34' of the ball member D is above the centerline 34 which is the axis of rotation of actuator F.

When actuator F is rotated a quarter turn by use of the handle 44, the key 32 rotates from a vertical to a horizontal position and in so doing forces the ball member D downwardly to the extent that the centerline 34' is coaxially aligned with the centerline 34. Such downward movement is possible due to the deformation of the elastomeric ring 62 that decreased in thickness, and the inner face bulging inwardly to assume the configuration 62b shown in FIG. 3.

While the ball member D is so disposed, the first ring 64 of the second valve seat is slid downwardly in passage 14 to rest thereon as shown in FIG. 3. The segments 76a, 76b, 76c and 76d are slid into engagement with one another as shown in FIGS. 3 and 5. The locking ring 86 of the second seat assembly is now moved downwardly in passage 14, with the sealing ring 70 in abutting contact with the exterior surface of the ball member D. The snap ring 26 is caused to removably engage groove 26. The longitudinal length of the second valve seat E is such that when the snap ring 24 is in place as shown in FIG. 3, the sealing ring 70 is in pressure sealing contact with the exterior surface of ball member D, and the transverse centerline 34' is coaxially aligned with transverse centerline 34.

When ball member D is rotated one quarter turn the key 32 is longitudinally aligned with passage 14. The elastomeric ring 62 at all times tends to return towards its initial configuration it must increase in thickness and in so doing tends to move the ball member D upwardly. However the ball member D cannot move upwardly appreciably for the locking ring 86 of the second valve seat E is removably locked in a fixed position within the valve body B. Thus, the ball member D after the two quarter turns thereof as above described will rotate on substantially the centerline 34, and the compressed elastomeric ring 62 will force the sealing ring 60 of the first valve seat C into slidable sealing contact with the exterior surface of the ball member D with a force of predetermined magnitude that is resisted by an equal and opposite force exerted by the sealing ring 70 of the second valve seat E.

From the above description it will be seen that a rotary ball valve is provided in which the ball member D is at all times when assembled as shown in FIG. 3 subjected to equal sealing pressure by the resilient rings 60 and 70.

When the ball member D is in the closed position as shown in FIG. 3 and subjected to an upward force from high pressure gas or well fluid in the passage 14a, this upward force will be transmitted through the ball member to first ring 64 of the second valve seat assembly E. This upward force will be transferred to the segmented ring 76. As the segmented ring 76 attempts to move upwardly, the external upwardly and inwardly tapered side surface 82 thereof imparts at outwardly directed force to the valve body B due to pressure contact with the wall recess 14b that tapers upwardly and inwardly. Also, as the segmented ring 76 tends to be forced upwardly, the internal tapered side surface 80 thereof pressure contacts the tapered outer surface 94 of the locking ring. Due to this pressure contact, a portion of the upward force on ball member D is transferred transversely to the locking ring 86.

From the above description it will be seen that the upward longitudinal force exerted by the ball member D on the second valve seat assembly E is transformed partially by the segmented ring 76 into an outwardly force exerted on the valve body B and an inwardly directed force on the locking ring 86.

Due to this transformation of the upwardly directed force in part to laterally directed forces, the valve body B may be more compact and of lighter structure than if the valve body was required to withstand the entire longitudinal force exerted upwardly on the valve member D.

The use and operation of the invention has been described previously in detail and need not be repeated.

What is claimed is:

1. A high pressure valve of the type that includes an elongate valve body that has first and second passages extending longitudinally therethrough from an upper first end and a lower second end that is their junction define a circular body shoulder, a lower valve seat assembly in said first passage that rests on said body shoulder and is partially defined by a resilient member; a ball member in said valve body, said ball member having a diametrical passage therein that may be aligned with said first and second passages when said ball member is rotated from a first to a second position, said ball member when in said first position being longitudinally movable relative to said valve body, means for rotating said valve member between said first and second positions, said high pressure valve being characterized by including an upper valve seat assembly in said first passage that distributes an upwardly directed longitudinal force exerted by high pressure fluid in said second passage on said ball member both longitudinally and tranversely to said valve body, when said ball member is in said first position, said upper valve seat assembly including:

a. a rigid ring slidably mounted in said first passage, said rigid ring having a concave surface in abutting contact with said ball member, with the internal diameter of said ring greater than the diameter of said second passage, said concave surface having a first circular recess therein, and said rigid ring including a cylindrical side surface and a top surface;

b. a first resilient ring mounted in said first recess and projecting therefrom that slidably and sealingly engages said ball member;

c. a rigid segmented ring in said first passage that rests on said top surface of said rigid ring, said segmented ring including an upwardly and inwardly tapered external side surface and an upwardly and outwardly tapered internal side, said external surface in abutting contact with a circular upwardly and inwardly tapered recess defined in said valve body adjacent said first passage with said segmented ring when it attempts to move longitudinally toward said first passage by a longitudinal force exerted thereon transferring a position of said longitudinal force transversely to said valve body said segmented ring defined by a plurality of rigid segments that have lower portions and a plurality of flat bottomed flanges that extend inwardly towards one another from said lower portions, with said flat bottomed flanges resting on said top surface of said rigid ring;

d. a rigid locking ring that includes an upper cylindrical portion slidably mounted in said first passage and a second portion that extends downwardly therefrom, said second portion having an external upwardly and outwardly tapered side surface that is in abutting contact with said internal side surface of said segmented ring, said cylindrical portion including a top surface; and e. a snap ring that removably engages a recess in said valve body in said first passage, said snap ring in abutting contact with said locking ring to prevent movement of said locking ring towards said first passage, with an upward force on said ball member when the latter is in said first position being transferred through said rigid ring to said segmented ring, with said segmented ring as said tapered external side surface attempts to move upwardly relative to said tapered recess transforming a portion of said upward force to a transverse outwardly directed force on said valve body, and said internal tapered side surface of said segmented ring as it attempts to move upwardly relative to said upwardly and outwardly tapered surface of said second portion of said locking ring transforming a portion of said upward longitudinal force to a transverse inwardly directed force on said second portion.

2. A high pressure valve as defined in claim 1, in which said cylindrical side surface and said top surface of said rigid ring define a circumferentially extending groove, and in addition including:

f. a second resilient ring disposed in said groove that is compressed by a portion of said flat bottom flanges into fluid sealing contact therewith and with the material defining said first passage and said rigid ring.

* * * * *